United States Patent

Alber et al.

[19]

[11] Patent Number: 6,034,347
[45] Date of Patent: Mar. 7, 2000

[54] CONTINUOUS BUTT-WELDING PROCESS AND DEVICE FOR METAL SHEETS, IN PARTICULAR FOR BUILDING CAR BODIES IN THE CAR INDUSTRY

[75] Inventors: Gerhard Alber, Ravensburg, Germany; Gerhard Neurohr, deceased, late of Wadern, Germany, by Hildegard Neurohr geb Juen, executor

[73] Assignee: Thyssen Industrie AG, Germany

[21] Appl. No.: 08/930,381

[22] PCT Filed: Dec. 22, 1995

[86] PCT No.: PCT/EP95/05108

§ 371 Date: Jan. 26, 1998

§ 102(e) Date: Jan. 26, 1998

[87] PCT Pub. No.: WO96/30160

PCT Pub. Date: Oct. 3, 1996

[30] Foreign Application Priority Data

Mar. 25, 1995 [DE] Germany ............................ 195 11 098

[51] Int. Cl.[7] ............................................. B23K 26/00
[52] U.S. Cl. ................. 219/121.64; 219/121.63
[58] Field of Search .................. 219/121.63, 121.64, 219/121.13, 121.14, 161, 121.83; 228/44.3, 49.4, 212

[56] References Cited

U.S. PATENT DOCUMENTS

| 4,924,063 | 5/1990 | Buchel et al. ....................... 219/121.64 |
| 5,045,668 | 9/1991 | Neiheisel et al. ................... 216/121.83 |
| 5,131,581 | 7/1992 | Geiermann ............................. 228/49.4 |
| 5,204,505 | 4/1993 | Prange et al. ...................... 219/121.63 |
| 5,328,083 | 7/1994 | Peru et al. .................................. 228/5.7 |
| 5,364,006 | 11/1994 | Gilles et al. ............................. 228/4.1 |
| 5,605,275 | 2/1997 | Rintala ................................... 228/49.4 |
| 5,614,112 | 3/1997 | Peru et al. ......................... 219/121.63 |
| 5,747,768 | 5/1998 | Peru et al. ......................... 219/121.63 |
| 5,749,511 | 5/1998 | Aebersold et al. ...................... 228/212 |
| 5,814,786 | 9/1998 | Johnson et al. ................... 219/121.63 |
| 5,841,098 | 11/1998 | Gedrat et al. ...................... 219/121.63 |
| 5,878,944 | 3/1999 | Aebersold et al. ..................... 228/212 |

FOREIGN PATENT DOCUMENTS

| 0450349 | 6/1993 | European Pat. Off. . |
| 38 01 626 | 12/1988 | Germany . |
| 37 23 611 | 1/1989 | Germany . |
| 38 30 892 | 9/1989 | Germany . |
| 40 22 062 | 11/1991 | Germany . |
| 195 11 098 C1 | 4/1996 | Germany . |

Primary Examiner—Geoffrey S. Evans
Attorney, Agent, or Firm—McGlew and Tuttle, P.C.

[57] ABSTRACT

A process and device for continuous butt-welding of metal sheets, in particular for car body building in the car industry, by beam welding. According to this device and process it is outlined that a precise abutting and welding of metal sheets is feasible without a precise alignment of metal sheets to be welded and laid on transport paths. This is accomplished by a special control of metal sheets to be welded together and by seam position sensors.

12 Claims, 11 Drawing Sheets

CONTINUOUS BUTT-WELDING PROCESS AND DEVICE FOR METAL SHEETS, IN PARTICULAR FOR BUILDING CAR BODIES IN THE CAR INDUSTRY

FIELD OF THE INVENTION

The invention concerns a process for continuous butt-welding of metal sheets, in particular for car body building in the car industry. Furthermore, this invention concerns a device for performing the continuous butt-welding process described.

BACKGROUND OF THE INVENTION

With the customary welding processes, in particular beam welding (electron beam welding, laser beam welding), there are two methods known:

a) Metal sheets are positioned precisely with respect to a travelling beam welding tool, clamped, and welded. This process is not a continuous welding process.

b) Metal sheets, arriving from joggled planes to mechanical, high-precision templates, are introduced into and welded by a stationary beam welding tool. With this process the metal sheets are welded continuously.

Both methods entail considerable work in creating the requisite mechanical precision (approx. 0.03 mm) and pose problems with respect to mechanical wear incurred during the production. This wear leads to losses in quality when metal sheets are welded.

Previously known from DE 38 30 892 is a process for determining the relative position of a weld seam to a specifiable target position in order to be able to rectify the relative position of the welding laser beam to the weld seam. In the rectification process a collimated laser measuring beam around the seam path is alternately deflected and focused and, after reflection from the workpiece arrangement forming the weld seam, received by an optoelectronic sensor and transmitted to a repositioning device. This process serves to determine the position of a weld seam relative to a specifiable target position in order to be able to rectify the relative position of the welding laser beam to a weld seam. Here the deflecting frequency of the deflected laser measuring beam should be at least 100 Hz, whereby the intensity of the laser measuring beam is modulated with at least 200 kHz in such a manner that the laser measuring beam impinges on the workpiece arrangement at a distance of no greater than 10 mm from the axis of the welding laser beam, whereby a single light-sensitive element only is used as an optoelectronic sensor. This has as a result that feed and weld speeds of 100 mm/s can be reached, whereby, at this feed speed, the seam path can be determined in a specified grid. Modulation of the laser diode radiation and further, subsequent demodulation of the sensor signal, amplitude modulated in addition by the workpieces, facilitate the elimination of disruptive influences exerted by the laser welding plasma and the Planck's radiation from the weld pool.

In DE 38 30 892 a level of the technology is also described with which, in the cases of a line weld, the starting and end points of the weld seam are determined with the assistance of a measuring beam superimposed precisely along the axis of the main laser or welding beam. The points thus determined are entered into the control program for the main laser beam, and the seam is welded between the determined points in accordance with the program specified—in the assumed case, a line weld.

Described in addition in DE 28 30 892 is a weld tracking system for automated arc welding with which the prepared weld seam is scanned with an alternately focused laser measuring beam at a measuring frequency of no greater than 10 Hz across the weld seam, and the position of the laser welding beam or the electrode holder relative to the weld seam is rectified accordingly in the event of a deviation of the weld seam from the target position. Used as the sensor with this known weld tracking system is a photodiode cell. Owing to the large number of measuring points and the time required for the evaluation, this weld tracking system has a measuring accuracy of only 0.2 to 0.5 mm.

Further described is that the diameter of the focused spot of a focused operating laser or welding beam may at times only be 0.1 to 0.2 mm. However, owing to this very low expansion of the focused spot, the weld seams intended for laser welding likewise exhibit very small cross sections. Assumed, therefore, for the welding of such weld seams can be a measuring accuracy of half the diameter of the focused spot, i.e. of about 0.05 mm.

Following this assumption, therefore, the measuring precision achievable with the known weld tracking systems used for arc welding no longer proves sufficient. The feed speed achieved for laser welding can be from 100 mm/s to 6 m/min and, in general, can be up to ten times greater than the speed for arc welding. For this reason also, the measuring frequency of the measuring systems known for arc welding proved insufficient since the measuring signals yielded by the oscillating measuring beam do not occur sufficiently fast enough in order to be able to reposition exactly the main laser beam at the given feed speeds.

Previously known from DE 37 23 61 1 is a device for the continuous buttwelding of strips and sheets by means of at least one stationary laser beam with tension rollers arranged in pairs vertically to the direction of travel and on both sides of the strips or sheets to be welded, whereby these tension rollers have hollow axles whereon roller tubes arranged at fixed axial intervals are mounted on bearings, and every welding head of the laser beam welding device is equipped with at least one tension roller in the interior of the hollow axle and where the gap between the roller tubes and an aperture in the hollow axle serves as a passage for the laser beam. With this device, the focused spot of the laser beam is to be directed onto the sheet edges for welding in the area clamped by the tension rollers. Clamping the sheets or strips by means of large and stable rollers helps prevent the sheet edges from warping and the sheets from twisting in the weld area.

DE 38 01 626 concerns a rotating circular scanner, functioning on the principle of triangulation, as an optical seam position sensor for a burner with a primary beam. This primary beam, fed in particular from a laser light source, is emitted eccentrically to an axis of rotation, describes a mathematical cylindrical or conical mantle, and is directed onto the surface of the workpiece where it forms a light spot travelling in a circle on the workpiece and where it is detected with an optical observation device which is arranged within the cylindrical or conical mantle, pointed towards the site of the light spot, and inclined to the optical axis of the primary beam. This optical observation device forms an image of the light spot on a photodiode array, lateral effect diode, or such like (secondary beam), whereby for every circumferential position of the circular scanner the corresponding related value pairs, comprising the circumferential position and the secondary beam position on the photodiode array, the lateral effect diode, or such like, are determined and transmitted as a sensor signal to the evaluation electronics. The photodiode array, the lateral effect diode, or such like is designed for two dimensional operations and fixed in a stationary position, i.e. nonrotating, and serves to determine simultaneously both values of the named value pair. The previous publication also mentions the concentric arrangement of a seam position sensor. Moreover, circular scanners are described which, when being used as seam position sensors for burners, can be arranged eccentrically to the burner axis ahead of the direction of welding or concentrically with the burner. These previously known circular scanners could assist in gaining information for the weld seam position in relation to the burner, the direction of the weld seam, and the weld seam configuration. This information on the weld seam configuration may permit, for example, that the welding parameters adjust themselves independently with respect to the changed seam conditions or that an alarm signal is triggered for the attention of maintenance personnel.

DE 40 22 062 concerns a device for the controlled feed of strips and butt welding along their longitudinal edges, whereby for each strip there is at least one deflector roller with controlled travel along the axis. The last deflector rollers (in the direction of the strip before the welding point) for each strip are vertically displaced so far from each other in their parallel axes that the longitudinal edges of the strips fed over the deflector rollers lie with respect to each other in the position required for welding and on the same vertical plane and are laterally displaced so far that between their opposite end surfaces there is a gap between the longitudinal sides. Also one of the last reflector rollers is mounted on movable bearings at the height position and another on movable bearings along the axis, whereby a welding device is provided whose welding beam is directed on the weld position between the last deflector rollers. Provided in addition are control means serving to change the axial positions of the deflector rollers. Furthermore, there are scanning means present. Owing to the horizontally joggled arrangement of the last deflector rollers of which one can be displaced with respect to the other in the axial direction, precision regulation of the position of the strips to each other should constantly ensure a gap of narrow tolerance between the longitudinal edges during production. The axial position of the last deflector rollers, lying along the axis at a distance from each other, is constantly regulated via the mentioned scanning means on the longitudinal edges of the strips so that the gap width required is constantly kept. The distance between the longitudinal edges of the strip is determined via a sensor and the results of the measurement evaluated by a computer. These yield the specifications to the positioning units of the regulator rollers. Before the strips are abutted at the vertex of the two last deflector rollers there takes place a precision regulation. These processes are achieved via sensors which determine the positions of the longitudinal edges of the strips relative to each other. The measurement values thus gained via the sensors are likewise evaluated by the computer. These evaluated results then yield the specifications for the precision regulation for the positioning unit of the last deflector roller, which is repositioned in the axial direction when a deviation from the target position of the longitudinal edges of the strip is established. The intended result thereby is that a constant predefinable gap is always available between the longitudinal edges of the strip before commencement of the welding process.

EP-A-0 450 349 concerns a process for the continuous welding of abutted strips or sheets without fillers by means of a laser beam, whereby the strips in the area of the weld seam in the direction of the strip feed are cooled directly behind the weld focus, whereby the cooling intensity as a function of the width of the gap formed directly before the weld focus by the abutting edges of the strips in the direction of the strip feed is regulated in such a manner that the width of the gap remains within the specified tolerance values. Cooling both sides of the strips is also proposed. Also proposed in this preliminary publication is a device for the continuous welding of abutted strips or plates at their abutting edges by means of a stationary laser beam with tension rollers arranged in pairs on both sides of the strips for welding and vertically to their feed direction—these tension rollers form in the area of the abutting edges of the strips a gap through which the stationary laser beam is directed onto the abutting edges for welding—and with a measuring device—arranged in the feed direction of the strip directly before the weld focus—for the width giving the actual value of the gap formed by the abutting edges of the strips. Furthermore, a regulating device is provided which includes the named measuring device and a cooling device arranged in the feed direction of the strip behind the weld focus and acting on the strips in the area of the weld seam—whose cooling intensity as a function of the actual value supplied by the measuring device is set for the gap width in the sense of a constant gap width lying within specified tolerance values.

SUMMARY AND OBJECTS OF THE INVENTION

The object of the invention is the task of creating a process for the continuous butt-welding of metal sheets at their longitudinal edges with which, independently of mechanical metal sheets, the relative position of the metal sheets and hence the weld seam is kept within a specified tolerance range with high precision.

Also forming the basis of the invention is the task of creating a device for the performance of the process according to the invention which is suitable with particular advantage, but not exclusively for the welding of car body sheets, in particular for the car industry.

The present invention accomplishes its objectives by transporting first and second sheets in a feed direction to a welding means. The welding means has a theoretical or ideal welding line. However, the joints or seams between the two sheets is not always in line with this theoretical or ideal welding line. While the first sheet is being transported, it is moved in the feed direction along a guide. The guide is aligned with the theoretical welding line. The second sheet is also transported in coordination with the transporting of the first sheet. Either just before, or after, the first sheet leaves the guide, the first sheet is locked in its aligned position so that it cannot move laterally, or perpendicularly to the feed direction. The first sheet is still movable in the feed direction. Once the first sheet is locked, the second sheet is driven against the first sheet to position the longitudinal sides of the first and second sheets against each other. These are the longitudinal sides which will be welded. During the driving, a force is applied to the second sheet to move it in the longitudinal direction. This force is preferably opposite to the feeding direction and forces the second sheet against a drag element. This properly positions the first and second sheets with respect to each other in the feed direction. The first and second sheets are then moved synchronously with each other to hold the relative predetermined position. In this predetermined position, the two sheets are synchronously moved passed a seam position sensor. The seam or joint between the first and second sheets is determined from the seam position sensor and the position of the welding means is adjusted to the determined seam. The welding means then welds the first and second sheets to each other.

In the process according to the invention, a mechanically precise alignment of the sheets to be welded together relative to the beam welding tool, e.g. a laser welding device, was intentionally dispensed with. Instead, the beam welding tool is repositioned to the abutting edges of the two metal sheets by means of seam position sensors.

The two sheets to be welded to each other are taken from a sheet stack either manually or in an automated process and placed on the feed area of the welding machine. From there the sheets are lifted into the welding machine.

For example, the metal sheet on the left, as seen in the feed direction, is designated the 'master or first sheet', the one on the right, as seen in the feed direction, the 'slave or second sheet'. The master sheet is transported in the feed direction in such a manner that it is pushed against a rigid straight guide arranged in the area of the weld seam and extending into the feed direction. This straight guide therefore serves to align the master sheet so that, at a later point, it lies with the sheet edge for welding within the view of a seam position sensor.

The slave sheet is transported towards the area for abutting. Here, the distance to the side of the master sheet can still be relatively large, for example from 10 to 60 mm.

Here, the speeds of the transport devices for the master and slave side are electronically synchronized, i.e. coordinated.

When the two sheets to be welded to each other (master sheet and slave sheet) enter into the area for abutting in the welding machine, the master sheet is locked firmly into place. This ensures the directional precision of the master sheet even under the influence of lateral counterforces. At the same time, forces are exerted on the slave sheet to ensure that it does not slip out of position during further transport. This brings about two overlapping movements, namely:

a) Relative to the direction of transport the slave sheet reduces its speed as a function of its retaining force, and this happens until the slave sheet is carried along by a fixed stop. Since the driven movement of the slave side is synchronized with the driven movement of the master side, the master and slave sheets are now positioned to one another in the direction of welding and continue to move towards the welding machine.

b) The effects of the lateral forces on the slave sheet drive it against the master sheet, and hence abuts the master sheet.

The abutting force on the slave sheet can be regulated and set and must always be less than the retaining forces acting on the master sheet.

The metal sheets now abutted are introduced to a beam welding tool, for example a laser welding device or an electron beam welding device.

Normally it can be assumed that the seam to be welded, i.e. the seam area of master sheet and slave sheet, is not positioned exactly relative to the beam welding tool. For this reason, the area of the weld seam is determined via seam position sensors and the beam welding tool is repositioned to the weld seam. This takes place on the strength of the values for a positioning control measured and transmitted by the seam position sensors. The positioning control forwards to the drive or the drives of the beam welding device the corresponding setting values. Hence the beam welding tool is repositioned to the current run of the sheets' abutting seam.

Assumed for this invention, therefore, is the experience that an absolute directional precision of metal sheets entering into a machine can never be attained in practice.

If the master sheet and the slave sheet are welded within a relatively small distance after the seam position sensors (as seen in the direction of sheet feed) then the provision of only the one seam position sensor is perfectly adequate since it can be assumed that the position of the weld seam, i.e. the abutting seam between the sheets to be welded to each other, has changed but little along the transport path. For this reason, the scope of the invention also includes variant forms with which only one seam position sensor finds application.

In one embodiment two seam position sensors are provided in the feed direction of the sheets to be welded to each other. This yields as a consequence the advantage that the sensors can be installed at a relatively large distance from the weld focus so that they cannot be soiled by spatter, coolants, or such like. The measurement values determined by the first and second sensors are forwarded to a computer which calculates on the basis of the input measurement values the site at which a particular weld seam area is located should it pass by the weld focus orthogonally. In this event the beam welding tool can be controlled so that the beam welding tool is located exactly over this site at the calculated time at which the calculated weld seam area reaches this position. Consequently, in this manner, the beam welding tool is constantly controlled so that it is located exactly above the weld seam area to be welded at the correct time calculated from the speed with which the sheets move towards the beam welding tool, i.e. in the transport direction, as a function of the measurement results measured via the sensors.

Another further advantageous operation of the invention involves constantly determining the gap width between the metal sheets with the seam position sensors either one or two sensors. With a control circuit installed, the power of the weld beam, for example of a laser welding device, the requisite cooling power for the weld process (water, gas), the requisite focus position of the weld beam, and the weld speed can therefore be constantly adjusted. This guarantees optimal welding capacity and optimal economic efficiency for the welding process.

With optimal economic efficiency of the welding machine, the device according to the invention makes possible continuous welding production so that high welding performance can be achieved, which is of particular advantage in particular for the welding of car body sheets, for example in the car industry.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Referring to the drawings, welding takes place without filler for the variant forms as seen from the drawing. If required, however, welding can take place with filler. It is also possible to weld coated, for example hot-dip galvanized sheets with or without filler, which, however, is not depicted in detail.

In the drawings the reference code 1 designates a master sheet and 2 a slave sheet which are to be connected to each other at their abutting longitudinal sides 3 and 4 respectively by a weld seam without welding filler to form the one piece.

Metal sheets 1 and 2 can, for example, be car body sheets for the car industry.

The reference codes 5 and 6 designate transport paths which can exhibit differing designs and whose individual elements are yet to be described. The direction of transport is designated with the reference code XX.

The transport paths 5 and 6 each include at least one transporter in the feed area 7 for the metal sheets 1 and 2 to be welded to each other; in an abutting area 8; and in a welding area 9 and a tilting table 10 for the output transport of the metal sheets 1 and 2 welded together.

Arranged behind one another on the side of the master sheet in the feed direction XX of the metal sheets 1 and 2 are magnetic rollers 11, magnetic strips 12 with transport rollers 13, and pressure rollers 14. In addition, a drag chain is designated with 34. The magnetic rollers 11, the magnetic strips 12, and the drag chains 34 are driven by motors. For reasons of simplicity these drive motors are not depicted.

Arranged behind one another on the slave sheet side in the transport direction XX are magnetic strips 15 with intermediate transport rollers 16. The magnetic strips 15 are driven by motors.

Figure 7:
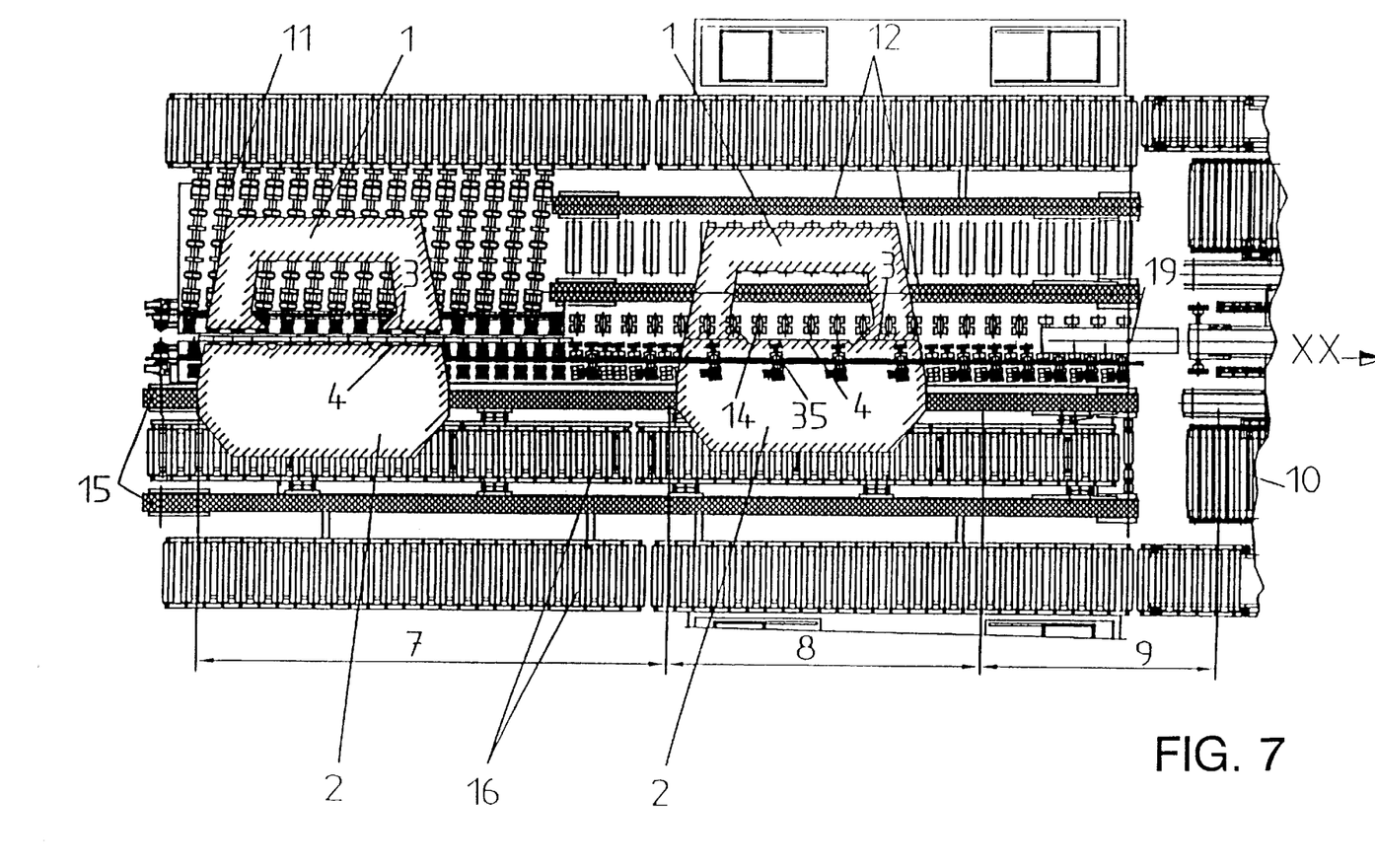
FIG. 7 is a partial top view in the direction of arrow VII of FIG. 6.

The reference numeral 17 designates a straight guide for the master sheet 1, whereas 18 is a centerline coinciding with the theoretical welding line and running through a weld focus (FIG. 7).

The reference code 20 designates in turn a motor-driven drag chain which can be designed and driven like the drag chain 34. The transport speed of the drives for the drag chains 20 and 34 can be regulated.

The transport paths 5 and 6 to the left and right of the device include transporters which extend into the area of the tilting table 10. A welding device 23 (FIG. 6) is designed for the variant form and is depicted as a laser welding device. The welding device 23 is arranged at a gate 24 extending over the transport paths for the metal sheets 1 and 2. The welding device 23 can be controlled vertically in the direction V-T (FIG. 8), i.e. in the direction of the Z axis, horizontally in the direction C-D (FIG. 8), i.e. in the direction of the Y axis, and at right angles to the feed direction XX and can be locked in the respective position required. For the welding of sheets of different thicknesses the welding head or the beam welding tool can be swivelled around an axis of rotation.

Figure 6:
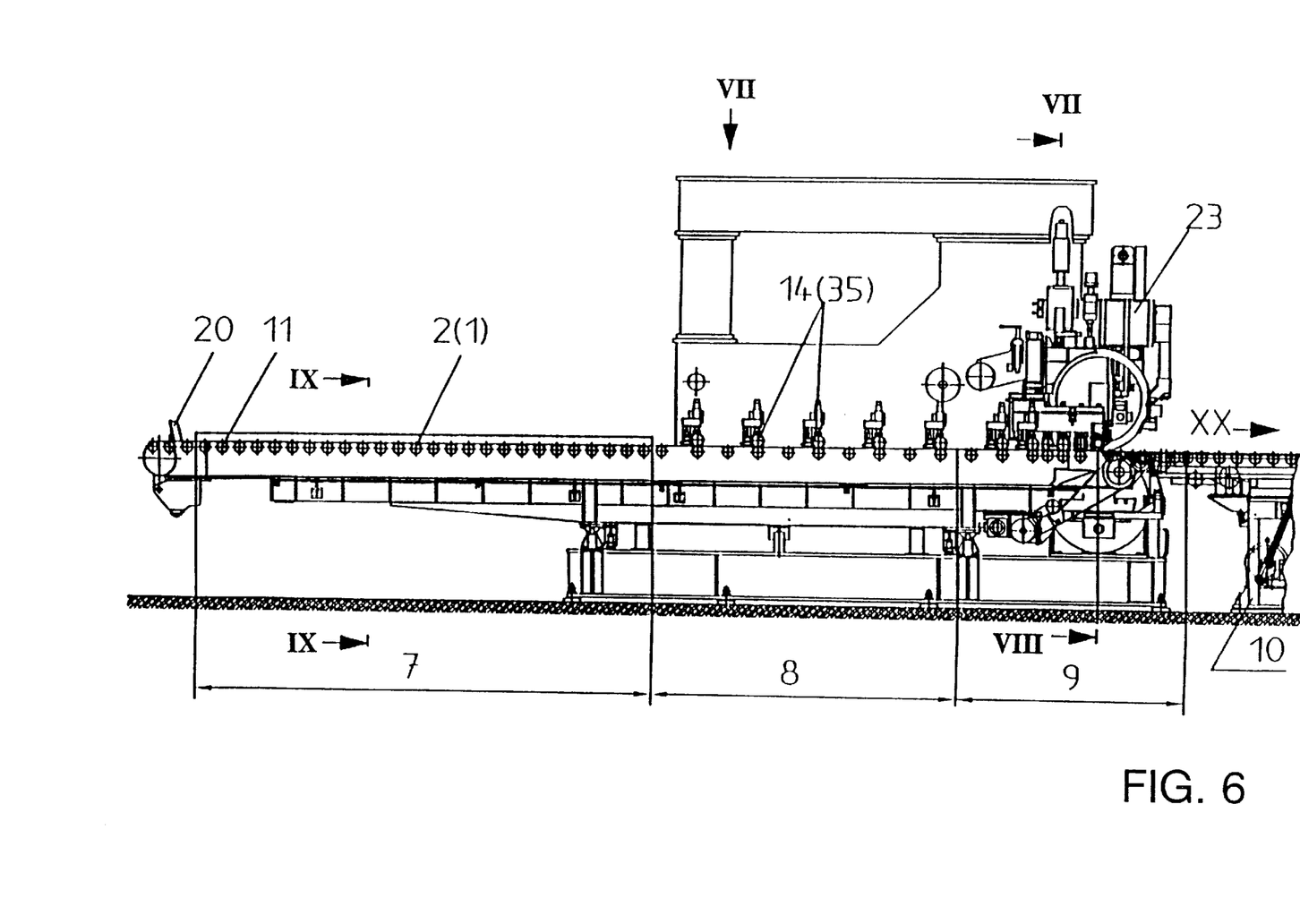
FIG. 6 is a side view—in part incomplete—of a device according to the invention.

The welding device 23 is fitted with a suitable beam welding tool, namely a laser welding device for the variant form depicted, whose electronic and electrical elements are not designated in detail. Also the means of control for the beam welding tool are not specially designated.

Allocated to the welding device 23 is a cooling device, for example water cooling, which is arranged behind the weld focus 19 and which is directed at this. But gas cooling, e.g. air cooling, can also be used.

Arranged in the feed direction XX before the weld focus 19 are suitable seam position sensors 27 which detect the weld seam area in a manner yet to be described and forward the values thus measured to a computer.

The sensor system 27 may be fitted with one or, in the feed direction XX, also two sensors arranged at an interval behind each other each of which detects the seam gap and forwards the values to the computer via electrical leads (not depicted here).

Figure 5:
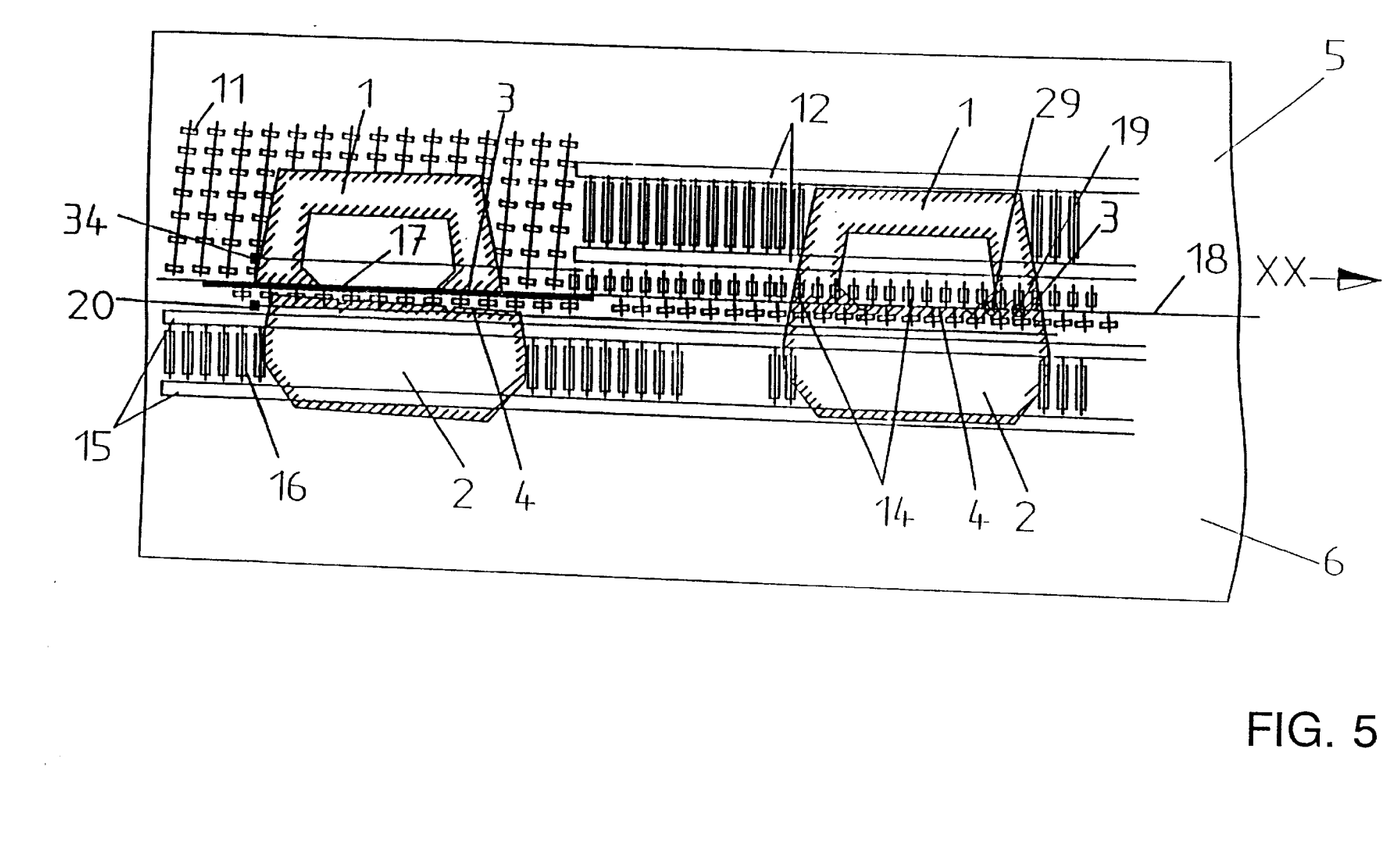
FIG. 5 is a further section of a device according to the invention, likewise top view, in the welding area.
Figure 10:
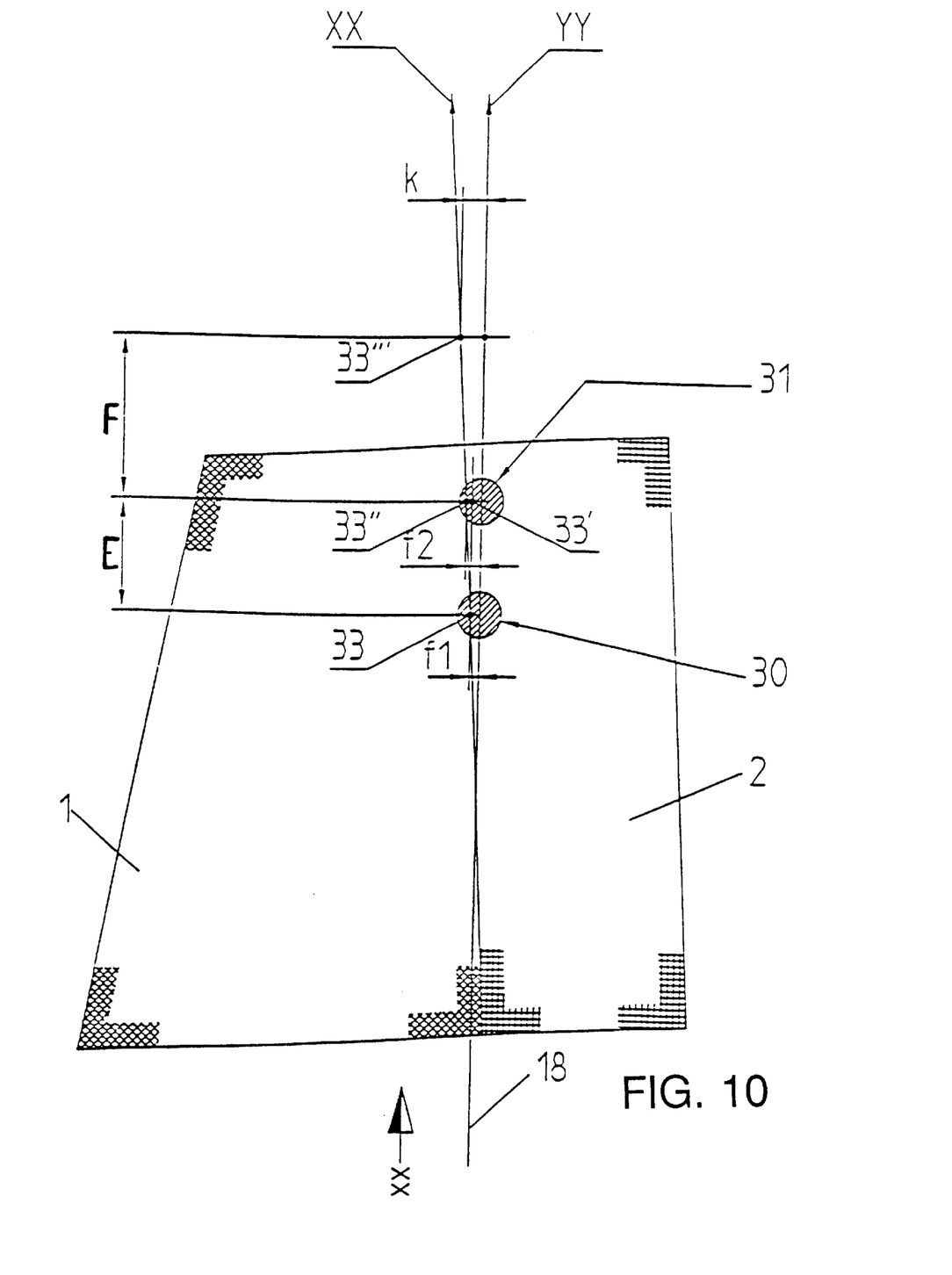
FIG. 10 is a top view of two metal sheets.

For the variant form in accordance with FIG. 5, the sensor system 27 is fitted with the one sensor only with a sensor window, whereas for the variant form in accordance with FIG. 10 two sensors 30 and 31 are allocated to the sensor system 27. In this case the distance of the two sensors 30 and 31 from the weld focus 19 measured in the feed direction XX is relatively large. This serves to protect the sensors 30 and 31.

Instead of two metal sheets 1 and 2, also four metal sheets, for example, can be welded together. For example, it is possible to connect first of all with a weld seam a master sheet 1 and a slave sheet 2 to form one piece and then to weld this one piece to two or more new metal sheets to form one piece so that there arises a single-piece sheet welded from four originally separate metal sheets.

Nor is it necessary to connect the sheets with a weld seam along their longitudinal sides to form one piece. Rather, it is also possible to weld together the sheets through butt-welding at any other sites (for example continuous seams) with a device and operation according to the invention.

Although both above and in the following the operations according to the invention are depicted and described in applications for the welding of car body sheets primarily finding application in the car industry, also those variant forms fall under the scopes and natures of the invention for which in place of a laser beam welding device other beam welding tools and other application areas find application.

Figure 1:
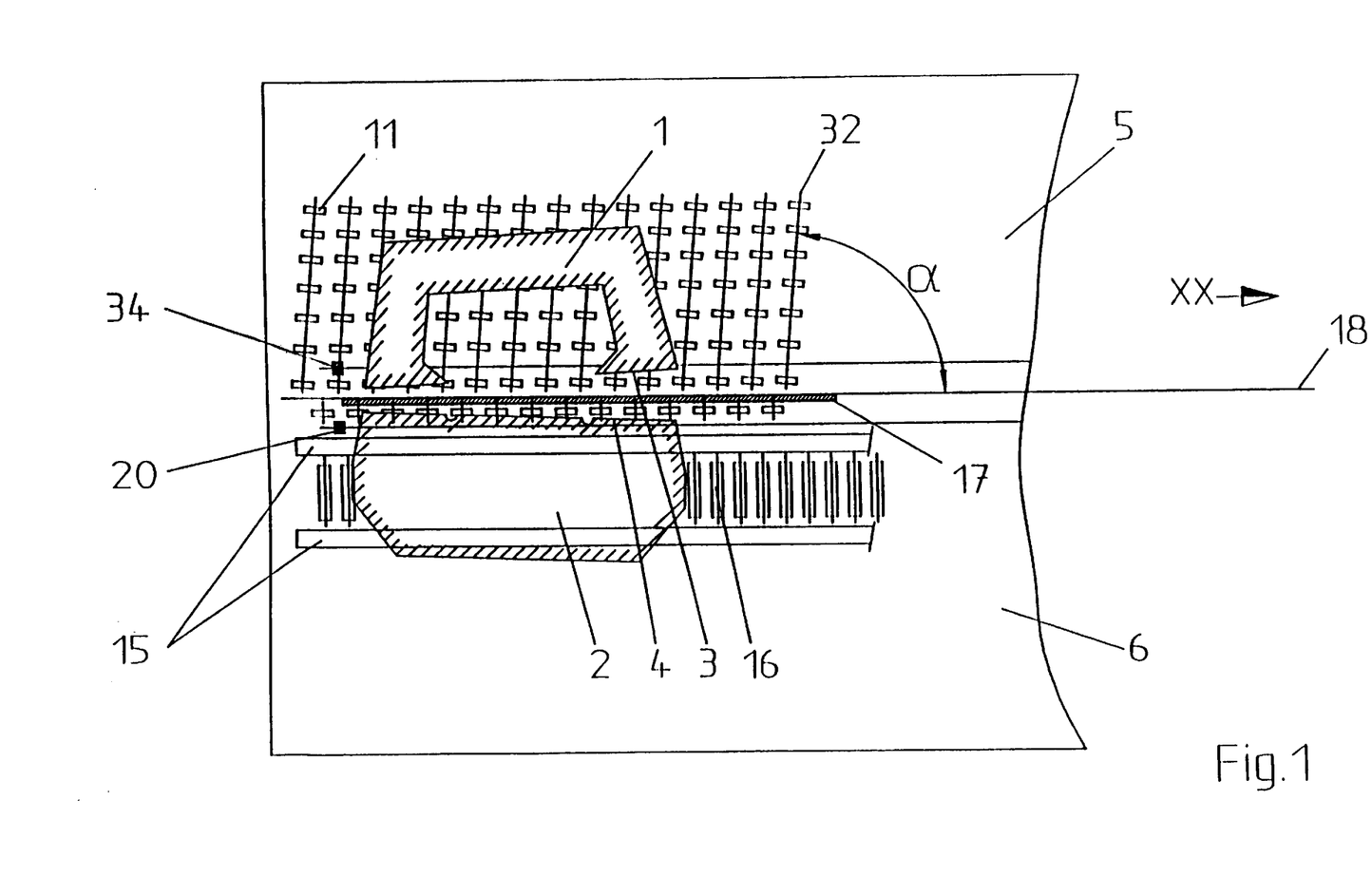
FIG. 1 is top view—in part incomplete—of a device according to the invention when the metal sheets are being placed in the machine.

With the process according to the invention, a mechanically precise alignment of the metal sheets 1 and 2 to be connected to each other by welding relative to the beam welding tool is dispensed with. Instead, the beam welding tool is repositioned to the abutting edges of the sheets, i.e. to the seam run, by means of seam position sensors. This is done through the following operations:

A master sheet 1 and a slave sheet 2 are each taken from a sheet stack (not depicted) either manually or in an automated process, placed on the transport paths 5 and 6 respectively, and are lifted from there onto the magnetic rollers 11 on the one hand and the magnetic strips 15 on the other hand (FIG. 1).

Figure 2:
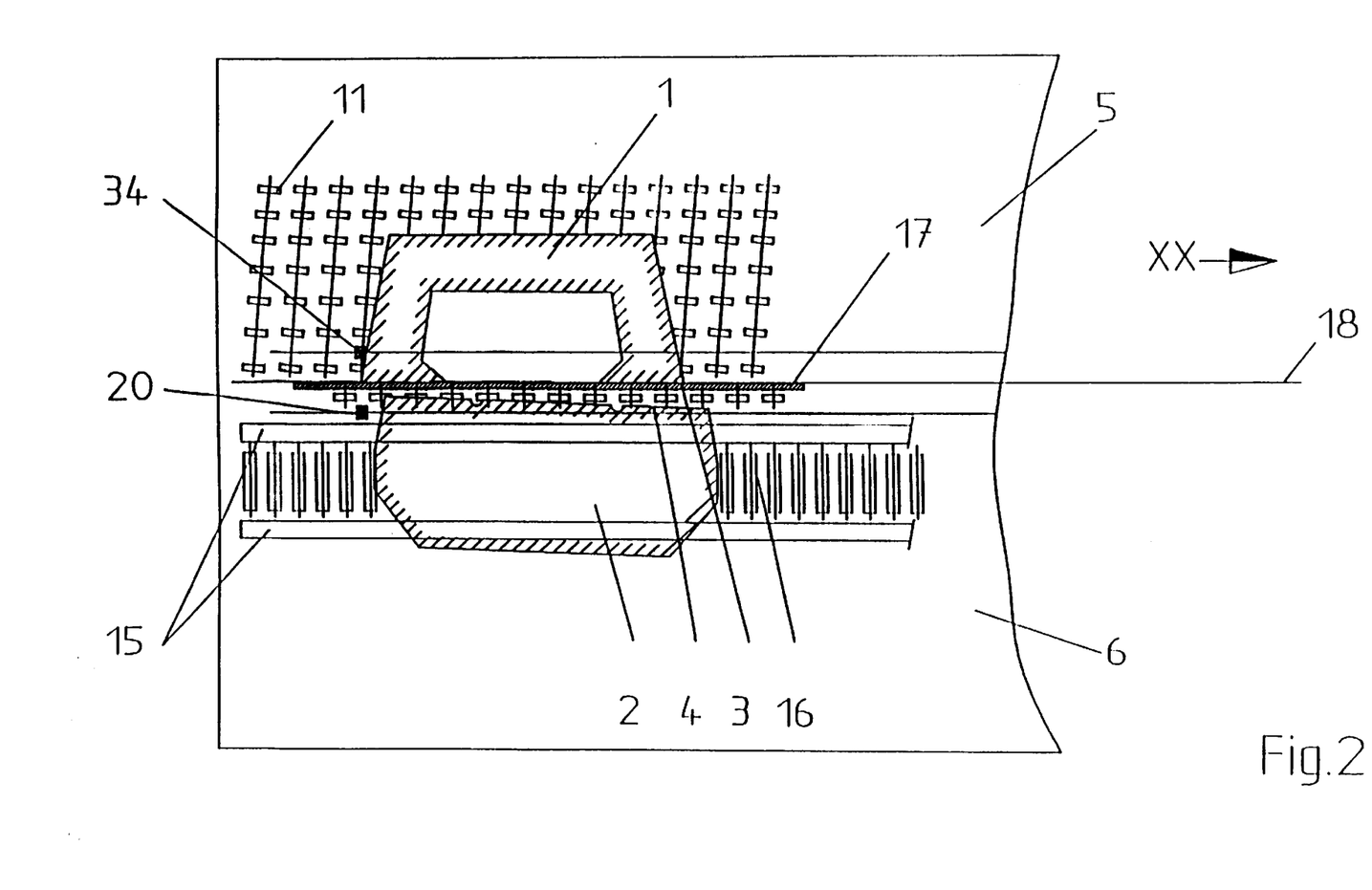
FIG. 2 is the device as seen in FIG. 1 after the master sheet has been aligned.

Thereupon the master sheet 1 is transported by the drag element of the drag chain 34 in the feed direction XX. The master sheet 1 thereby moves to the magnetic rollers 11 whose axes of rotation, for example 32, run under an acute angle (a) in a row of rollers running at right angles to the feed direction XX. The magnetic rollers 11 therefore cause the master sheet 1 to be driven against the straight guide 17. The straight guide 17 therefore serves to align the master sheet 1 so that at a later point it lies with the longitudinal side 3 to be welded in the observation window of the corresponding sensor in the seam position sensors 27.

The slave sheet 2 lifted on the magnetic strips 15 is likewise transported in the direction XX, i.e. to the abutting area 8 (FIGS. 6 and 7). Here the distance from the side of the master sheet 1 is from about ten to sixty millimeters.

The transport speeds of the transport paths 5 and 6 for the master sheet 1 on the one hand and the slave sheet 2 on the other hand are electronically coordinated with each other.

Figure 3:
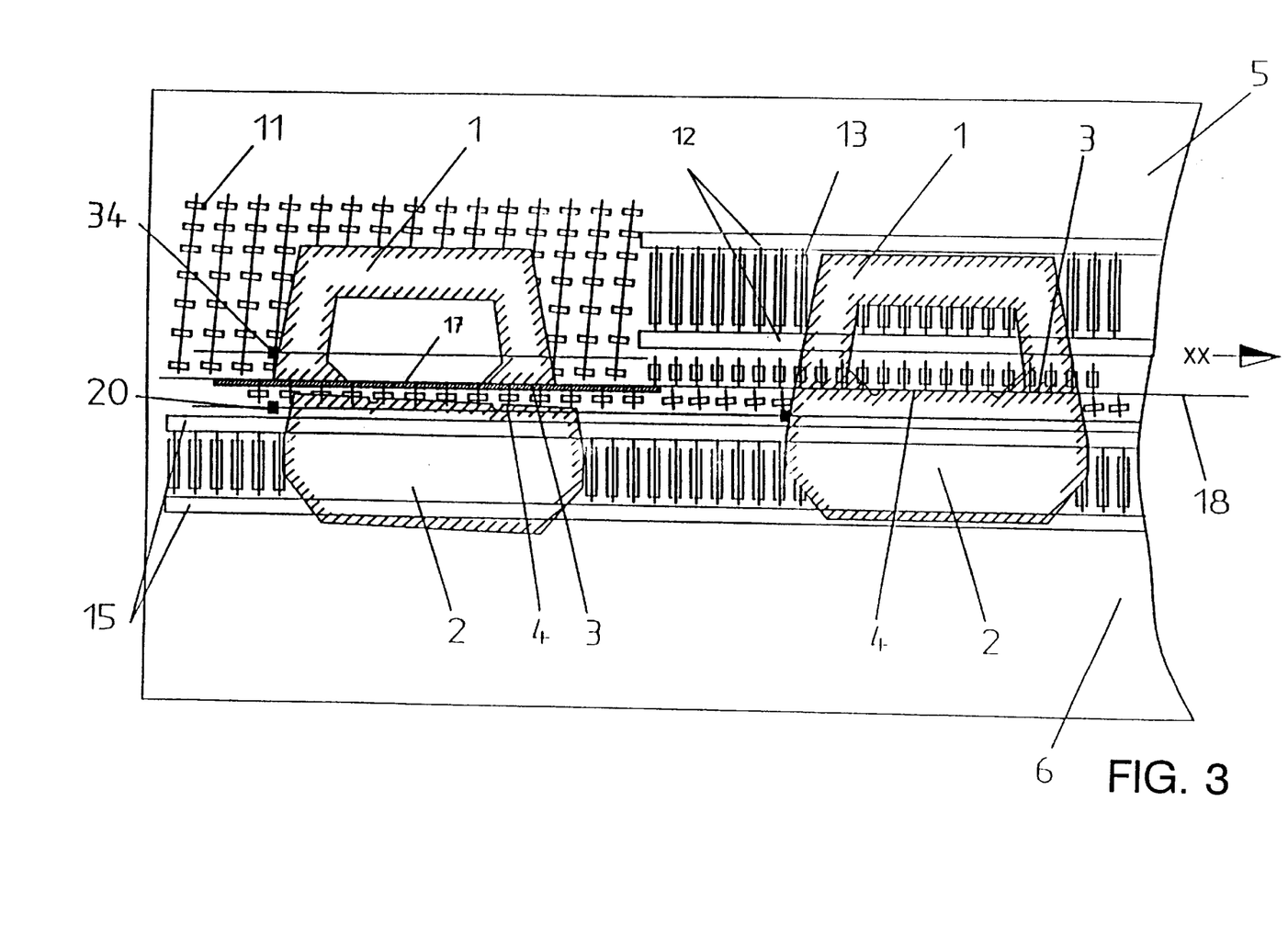
FIG. 3 is a further section of a device according to the invention, likewise top view, after the abutting of the master and slave sheets.

When the master sheet 1 and the slave sheet 2 enter into the abutting area 8 (FIG. 6 and 7) the master sheet 1 is pressed on the magnetic strips 12 by the pressure rollers 14 acting from above. As a result the directional precision of the master sheet 1 is also effected under the exertion of lateral forces. At the same time, placed on the slave sheet 2 are pressure rollers 35 acting from above whose axes of rotation likewise run at an acute angle to the feed direction XX. This brings about two superimposed movements, namely:

a) Relative to the drag chain 20 the slave sheet 2 reduces its speed in the direction XX owing to the counterforce from the pressure rollers 35. Consequently, the drag elements of the drag chain 20 catch up relative to the slave sheet 2 until a drag element lies against the rear edge as seen in the feed direction XX and therefore carries along the slave sheet 2. From this moment on, the further transport of the slave sheet 2 is effected by the drag chain 20. Since the drag chain 20 on the slave side is synchronized with the magnetic strips 12 for the master sheet 1, the master and the slave sheets 1 and 2 are positioned with each other in the feed direction XX and run towards the beam welding tool at the same speed.

b) The action of the pressure rollers 35 in an inclined arrangement pushes the slave sheet 2 against the master sheet 1 and therefore abuts them (FIG. 3).

The abutting force on the slave sheet 2 can be adjusted and must always be lower than the retaining forces acting on the master sheet 1.

Figure 4:
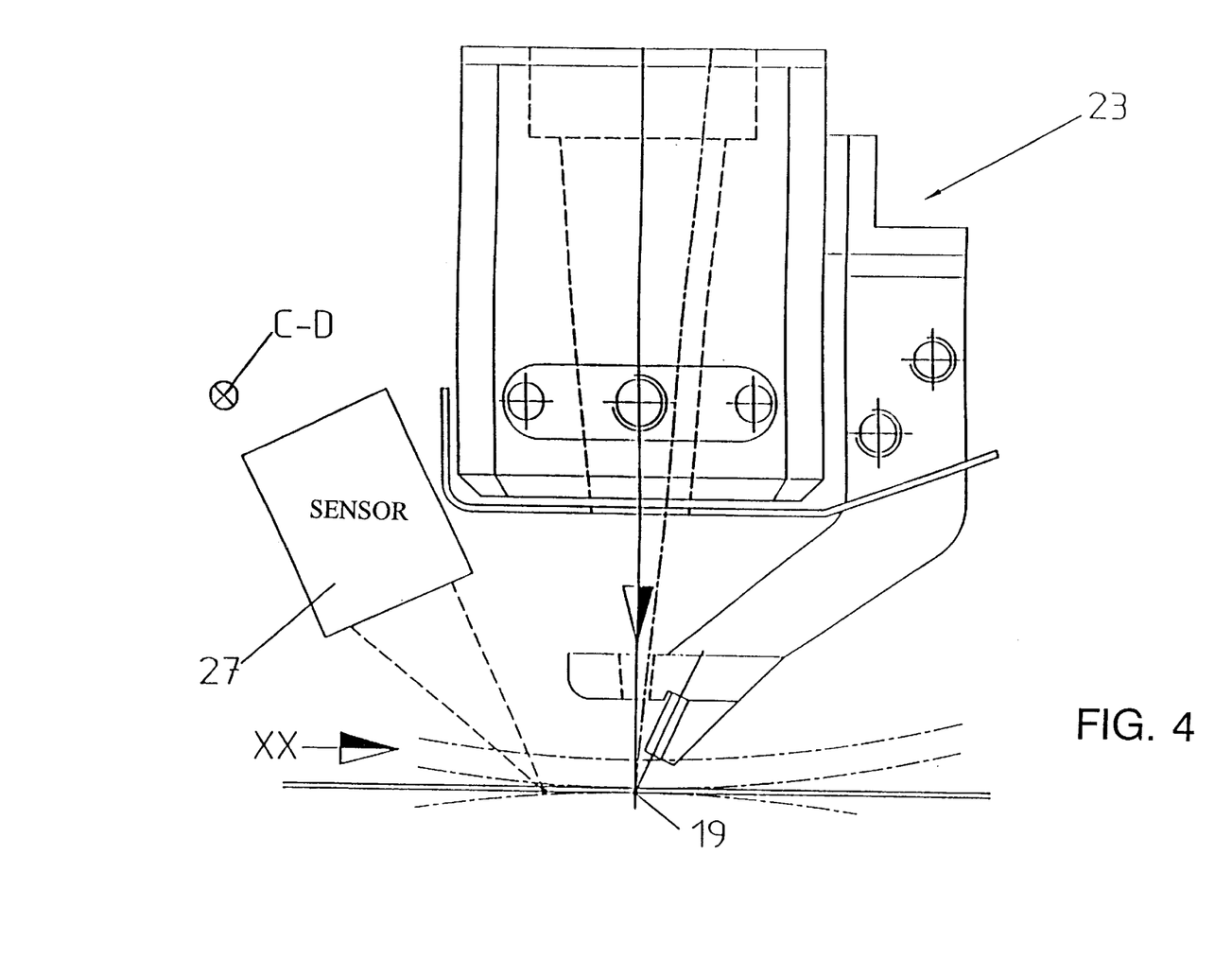
FIG. 4 is a side view—in part incomplete—of a welding machine with seam position sensors and water cooling.
Figure 8:
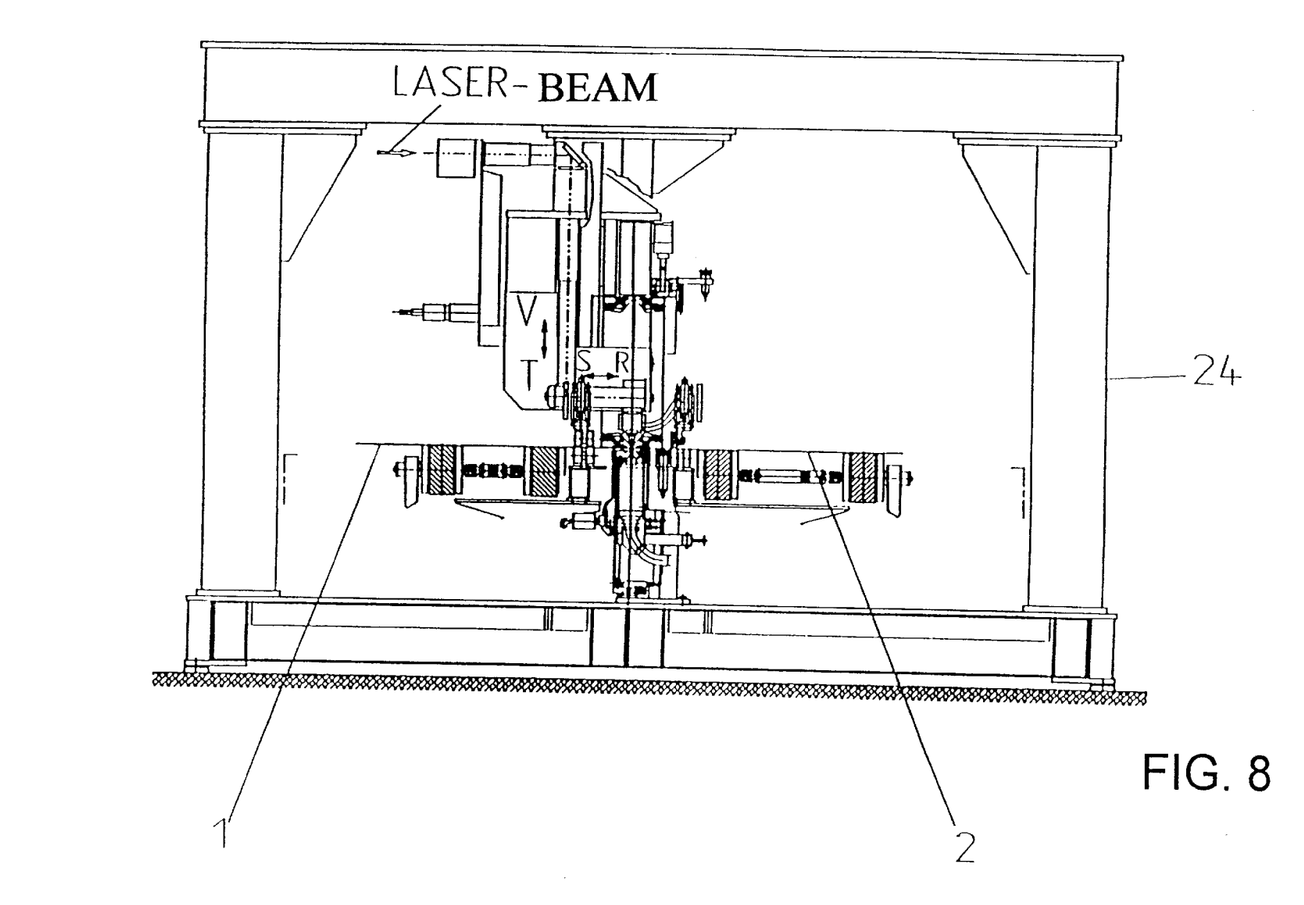
FIG. 8 is a section after line VIII—VIII in FIG. 6.
Figure 9:
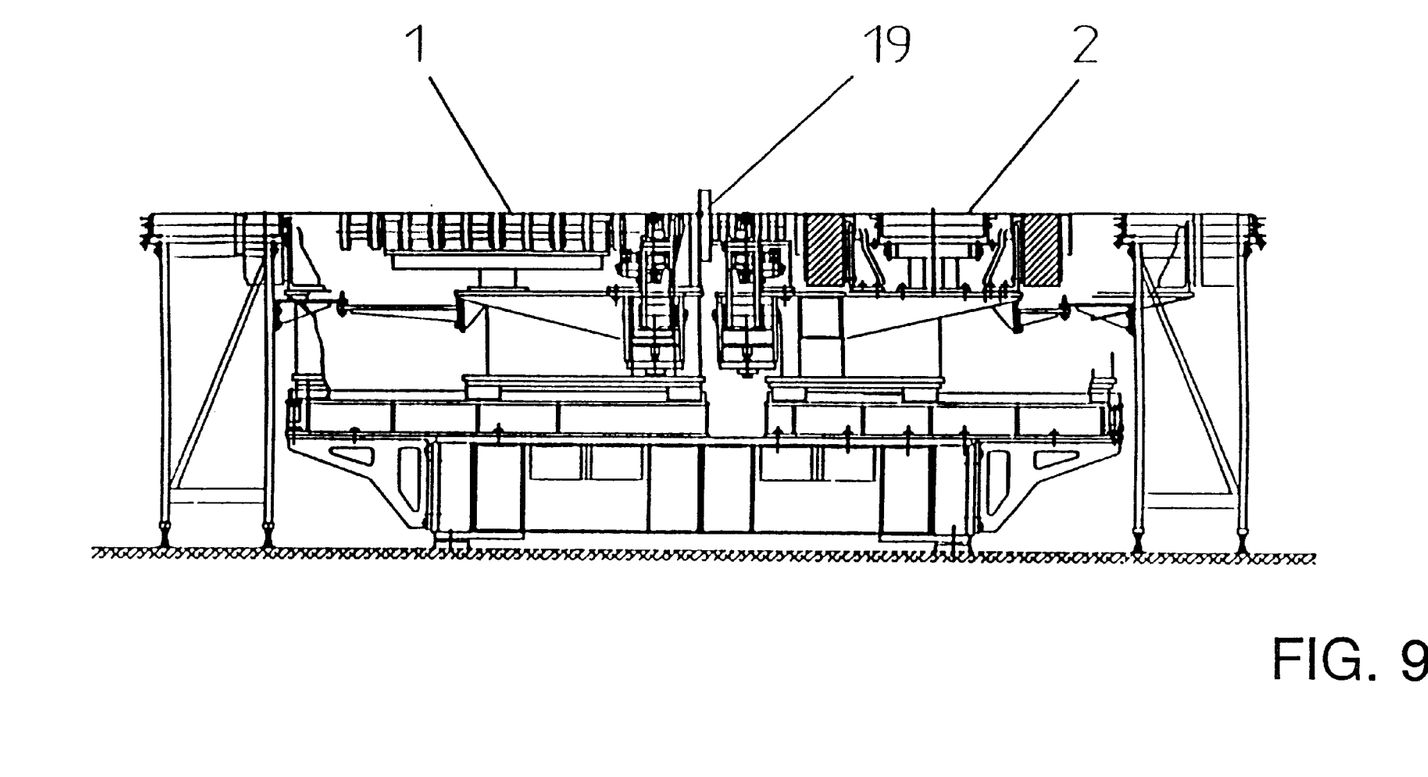
FIG. 9 is a section after line IX—IX in FIG. 6.

The metal sheets 1 and 2 abutted in accordance with the above operation are now introduced into the welding device 23. The abutting edges of the metal sheets 1 and 2 to be welded no longer lie exactly on the transport device relative to the beam welding tool. For this reason, it becomes necessary to determine by means of the seam position sensors 27 the run of the abutted seam and hence of the weld seam and to reposition the beam welding tool to this abutted seam between the sheets (FIGS. 4 and 5). The seam position sensors 27 forward thereby the measured values to a positional control (not depicted). This positional control forwards the corresponding setting values to the motor axis Y for an adjustment in the direction C or D. Consequently, the beam welding tool is repositioned to the actual run of the abutted seam between the sheets (FIG. 8). Assumed here is the consideration that in a machine the absolute directional precision of metal sheet 1 and therefore also the absolute directional precision of the abutted seam between the sheets cannot be achieved.

Furthermore, the gap width between the longitudinal sides 3 and 4 of the master sheet 1 and the slave sheet 2 can be determined with the seam position sensors 27. With a control circuit installed (not depicted), the power of the welding beam, the requisite cooling power of the cooling device for the welding process, and the requisite position of the weld focus 19 can be adjusted continuously. This facilitates the attainment of an optimal welding capacity and optimal economic efficiency of the weld template.

With the variant form described, only one sensor or only one sensor window is allocated to the sensor system 27.

Figure 11:
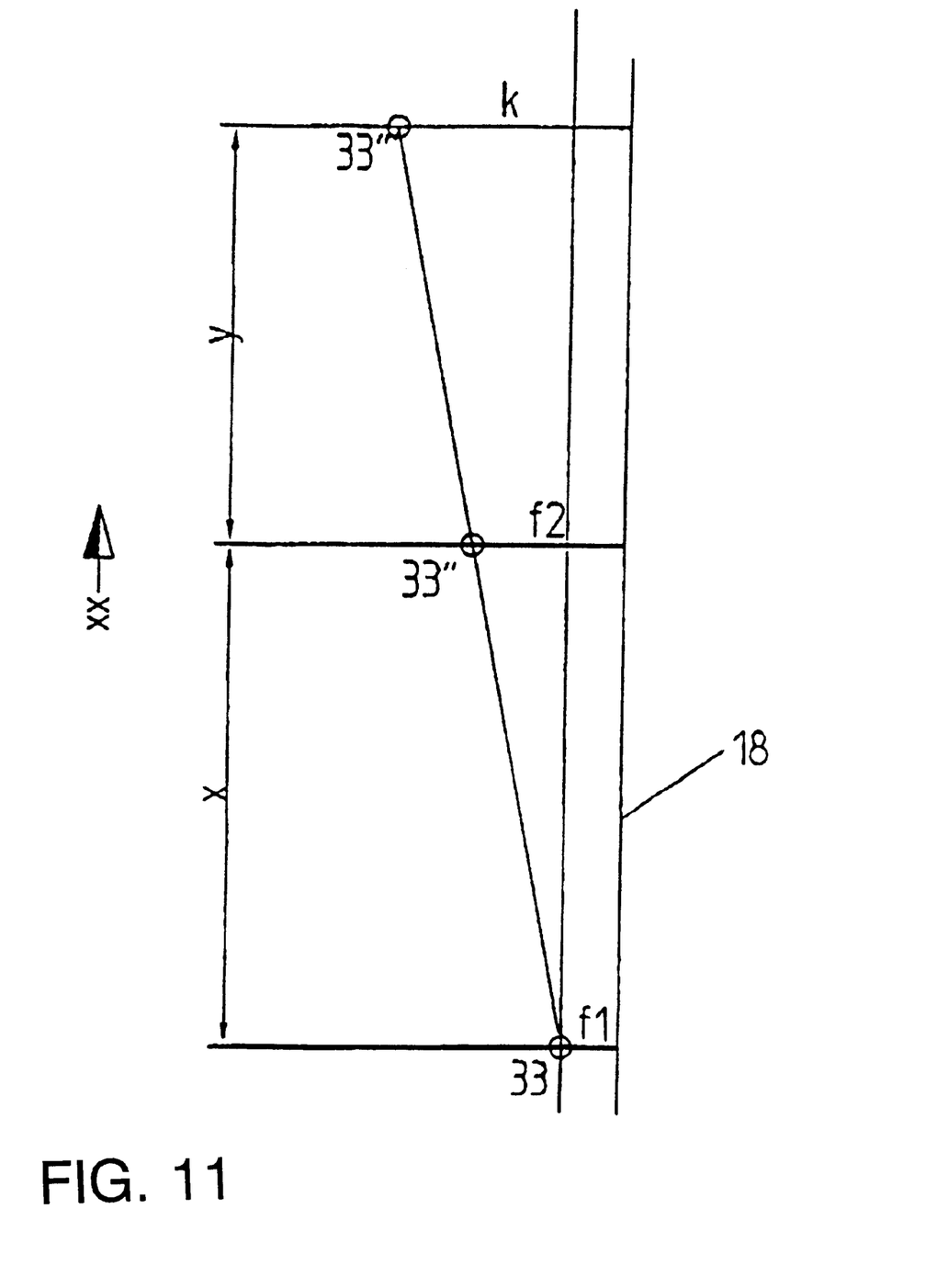
FIG. 11 is a sectional magnification of FIG. 10 as an illustration of the mathematical relationship.

With the variant form in accordance with FIGS. 10 and 11 two sensor windows, i.e. two sensors, are allocated to the sensor system in the feed direction XX.

FIG. 10 shows the position to one another of the two metal sheets 1 and 2 to be welded together.

In FIGS. 10 and 11:

$f_1$=deviation of a sheet edge point 33 from the theoretical weld point at the site measured by the first sensor 30.

$f_2$=deviation of a sheet edge point 33 from the theoretical weld point at the site measured by the second sensor 31.

33'=theoretical sheet edge point 33 at the site measured by the sensor 31. This point is attained only with mathematically exact directional precision of the metal sheets 1 and 2.

33"=actual sheet edge point 33 at the site measured by the second sensor 31. This point is obtained under actual operating conditions, i.e. in practice, owing to existing mechanical tolerances.

33'''=a sheet edge point 33, determinable by a computer function, at the weld site; calculated from $f_1$ and $f_2$.

k=deviation of the sheet edge point 33 from the theoretical welding point. k is the specification value for the Y axis of beam manipulation.

$k=f^*(f_1/f_2/ V_{weld})$

E, F const

YY=theoretical direction of movement of the metal sheets 1, 2.

The specification value k for beam manipulation must be set at the time when the sheet edge point 33 passes the sensor 30 in the welding axis. k is therefore a function of the welding speed and time. This yields the following geometric relationship:

$$(k-f_1)/(f_2-f_1)=(E+F)/E$$

$$k=((f_2-f_1)*(E+F))/E+f_1$$

It can be seen here that from the values measured by the sensors 30 and 31 the computer calculates the sheet edge point 33''' and, on the strength of this value, steers the beam welding tool to this site. As can be seen, the sensors 30 and 31 can be arranged at a relatively large distance from the actual welding point 33''' so that they are relatively well protected against welding spatter, but also against heat and the effects of coolants. This means fewer malfunctions.

The features described in the abstract, the patent claims, the description and those features presented in the drawing can prove essential both singly and in arbitrary combinations to the realization of the invention.

While specific embodiments of the invention have been shown and described in detail to illustrate the application of the principles of the invention, it will be understood that the invention may be embodied otherwise without departing from such principles.

We claim:

1. A continuous butt-welding process, the process comprising the steps of:

providing a first sheet to be welded;

providing a second sheet to be welded to said first sheet;

providing a welding means for welding said first and second sheets along a theoretical welding line while said first and second sheets are moving in a feed direction;

transporting said first sheet in said feed direction along a guide, said guide being aligned with said theoretical welding line;

transporting said second sheet in said feed direction and in coordination with said transporting of said first sheet;

locking said first sheet in a lateral position during said transporting, said locking occurring one of just before or after said first sheet leaves said guide;

driving said second sheet against said first sheet after said locking of said first sheet, said driving including forcing said second sheet into a predetermined position relative to said first sheet;

providing a seam position sensor;

synchronously moving said first and second sheets in said predetermined position past said seam position sensor;

determining a position of a seam of said first and second sheets from said seam position sensor;

adjusting said welding means to said seam determined from said seam position sensor;

welding said first and second sheets at said welding means during said transporting.

2. A process in accordance with claim 1, wherein:

said first and second sheets have longitudinal sides forming said seam;

said first and second sheets are placed on a feed area for said transporting;

transport speeds of said transporting are coordinated electronically with each other;

said locking is performed by forces acting from above said first sheet for a purpose of ensuring attainment of directional precision;

said driving is during said transporting and includes applying a force from above said second sheet to delay said transporting, said force bringing together said longitudinal sides of said first and second sheets into said predetermined position;

said determining including a computer receiving data from said seam position sensors and calculating welding seam position data according to a current course of said seam.

3. Process according to claim 1, wherein:

said welding means includes a weld focus;

two seam position sensors are provided in said feed direction at a distance from said weld focus, said two seam position sensors constantly forward to said welding means a deviation of a current seam run from a theoretical direction of movement.

4. Process according to claim 1, wherein:

said welding means includes a welding beam and a weld speed;

said determining also determining a power of said weld beam, a requisite cooling power for said welding, a focus position of said weld beam, and said weld speed via the seam position sensors;

an installed control circuit and said positioning movements requisite therefor are effected.

5. Device for continuously butt-welding first and second sheets, the device comprising:

first and second transport paths for the first and second sheets respectively, said first and second transport paths including a feed area, an abutting area, and a welding area;

a rigid drag element in said abutting and welding areas of each of said first and second transport paths for transporting of the first and second sheets in a feed direction;

welding means in said welding area and having a theoretical weld line, a beam welding tool, a positioning device for the adjustment of said beam welding tool in a direction substantially orthogonal to said feed direction;

a rigid straight guide arranged between said first and second transport paths, a center of said guide being positioned at a center of said theoretical weld line, said guide extending in a direction of said weld line and acting as a stop for the first sheet along said first transport path;

guide transport means for transporting the first sheet against one side of said rigid straight guide;

pressure rollers for one of the first or second sheets.

6. A device in accordance with claim 5, wherein:

siad positioning device of said welding tool is adjustable in a vertical direction, in a plane orthogonal to said vertical direction and in a plane othogonal to said feed direction.

7. A device in accordance with claim 5, wherein:

said first transport path includes magnetic rollers for the first sheet in said feed area, said magnetic rollers having axes of rotation inclined at an acute angle with said feed direction, said first transport path also including magnetic strips in said abutting area;

said second transport path includes one of magnetic strips or magnetic rollers in said feed area for acting on the second sheet;

each said drag element in said first and second transport paths includes a drag chain with rigid drag elements engagable against a rear side of the respective sheets in said feed direction.

8. A device in accordance with claim 5, wherein:

said first and second transport paths, said guide transport means and said pressure rollers move the first and second sheets together at a start of said abutting area to form a weld seam in said feed direction, said weld seam having a magnitude substantially 10 to 60 mm.

9. A device in accordance with claim 5, wherein:

said welding means includes a gate extending over and on two opposite sides of said first and second transport paths;

said beam welding tool and said positioning device being arranged on said gate.

10. A device in accordance with claim 5 wherein:

a sensor system is arranged on said welding means and can be moved together with said welding means.

11. A device in accordance with claim 10, wherein:

said sensor system is fitted with two sensor windows arranged at a spaced distance behind one another in said feed direction;

said welding means includes a weld focus;

a cooling device is provided for directing coolant to said weld focus, said cooling device being arranged on a side of said feed direction opposite said sensor system.

12. A device in accordance with claim 5, wherein:

a retaining force of said pressure rollers is adjustable.

* * * * *